(12) United States Patent
Chung et al.

(10) Patent No.: US 10,925,440 B2
(45) Date of Patent: Feb. 23, 2021

(54) DRIVING MECHANISM FOR MULTI FUNCTION FOOD PROCESSOR

(71) Applicant: Huiyang Allan Plastic & Electric Industries Co., Limited, Huizhou (CN)

(72) Inventors: Chi Yin Chung, Huizhou (CN); Wang Kei Kong, Huizhou (CN); Sing Wai Kwok, Huizhou (CN); Bin Hui Xiao, Huizhou (CN)

(73) Assignee: Huiyang Allan Plastic & Electric Industries Co., Limited, Guangdong (CN)

( * ) Notice: Subject to any disclaimer, the term of this patent is extended or adjusted under 35 U.S.C. 154(b) by 0 days.

(21) Appl. No.: 16/388,800

(22) Filed: Apr. 18, 2019

(65) Prior Publication Data

US 2020/0054173 A1 Feb. 20, 2020

(30) Foreign Application Priority Data

Apr. 20, 2018 (CN) .......................... 201810359996.3

(51) Int. Cl.
*F16H 1/14* (2006.01)
*F16H 1/16* (2006.01)
(Continued)

(52) U.S. Cl.
CPC .......... *A47J 43/082* (2013.01); *A47J 43/044* (2013.01); *A47J 43/046* (2013.01); *A47J 43/06* (2013.01); *F16H 1/14* (2013.01); *F16H 1/16* (2013.01); *F16H 1/2854* (2013.01); *F16H 37/065* (2013.01); *F16H 57/02* (2013.01); *A47J 2043/04454* (2013.01)

(58) Field of Classification Search
CPC ...... A47J 43/082; A47J 43/044; A47J 43/046; A47J 43/06; A47J 43/04454; A47J 44/02; F16H 1/14; F16H 1/16; F16H 1/2854; F16H 37/065; F16H 57/02
See application file for complete search history.

(56) References Cited

U.S. PATENT DOCUMENTS

2012/0167712 A1* 7/2012 Cheung .................. A47J 43/08
74/650

FOREIGN PATENT DOCUMENTS

| CN | 201019601 Y * | 2/2008 | .............. A47J 44/00 |
| CN | 104218730 A * | 12/2014 | .............. F16H 1/20 |

(Continued)

*Primary Examiner* — Tisha D Lewis
(74) *Attorney, Agent, or Firm* — Intellectual Property Law Group LLP

(57) ABSTRACT

Drive mechanism for a multi-function food processor with three drive outlets each couplable separately to a food processing component. The drive mechanism including: at one end of a motor, an output shaft having a first cone gear of a cone gear set and a worm; a first central drive shaft having a second cone gear meshing with the first cone gear, the first central drive shaft associated with the first and second drive outlets; the second drive outlet associated with the first central drive shaft by a first reduction gear arrangement which includes a first gear train meshing with a sun gear sleeved on the first central drive shaft; a second central drive shaft having a worm gear driven by the worm, the second central drive shaft associated with the third drive outlet; the third drive outlet associated with the second central drive shaft by a second gear reduction arrangement.

18 Claims, 7 Drawing Sheets

(51) Int. Cl.
*F16H 1/28* (2006.01)
*A47J 43/08* (2006.01)
*A47J 43/044* (2006.01)
*A47J 43/046* (2006.01)
*A47J 43/06* (2006.01)
*A47J 44/02* (2006.01)
*F16H 37/06* (2006.01)
*F16H 57/02* (2012.01)

(56) References Cited

FOREIGN PATENT DOCUMENTS

WO    WO-2013185677 A1 * 12/2013 ............ A47J 43/087
WO    WO-2018036780 A1 * 3/2018 .......... B01F 7/00583

* cited by examiner

DRIVING MECHANISM FOR MULTI FUNCTION FOOD PROCESSOR

CROSS-REFERENCE TO RELATED APPLICATION

This application claims benefit of China patent application no. 201810359996.3 filed Apr. 20, 2018, the disclosure of which is hereby incorporated by reference in its entirety for all purposes.

BACKGROUND OF THE INVENTION

1. Field of the Invention

The disclosure relates to the technical field of household kitchen appliances in the form of food processing machines. In particular the invention relates to a drive mechanism for a multi-function food processor with multiple drive outlets.

2. Background

At present, standard multi-function food processing machines for household kitchens employ a motor, a rotating connection outlet, and a food processing component (e.g. mixer, blender, etc. . . . ). The motor drives the food processing component through the connection outlet to complete the required processing of the food.

By way of this arrangement the connection outlet drives the food processing component at a single speed for processing food. However, in actual use, because different foods require different processing speeds, the output of a single speed can no longer meet the needs of end customers.

One solution to this problem is provided in Chinese patent ZL200720152632.5, which relates to a drive mechanism for a multi-function food processing machine that is capable of providing different speed outputs through changes of a gear train.

Although the described drive mechanism enables different food processing output speeds to be achieved, the overall volume of the drive mechanism is large. As a result, the overall size of a multi-function food processor with the drive mechanism of the earlier patent is large and inconvenient.

SUMMARY OF THE INVENTION

In order to solve the above technical problems, the present invention provides a drive mechanism for a multi-function food processor that not only facilitates a more compact multi-function food processor but also addresses the problem of long horizontal force transmission distances that are found in the drive mechanisms of existing systems.

The present invention provides a drive mechanism for a multi-function food processor with three drive outlets in accordance with the claims. Various preferable features are disclosed in the dependent claims.

The present invention also provides a multi-function food processor that comprises the drive mechanism of the present invention in accordance with the claims.

Described herein is a drive mechanism for a multi-function food processor with three drive outlets that can each be coupled separately to a food processing component. The drive mechanism comprising: a motor with a motor output shaft disposed at one end of the motor, wherein the motor output shaft comprises a first cone gear of a cone gear set and a worm; a first central drive shaft comprising a second cone gear of the cone gear set that meshes with the first cone gear of the motor output shaft, wherein the first central drive shaft is associated with the first drive outlet and the second drive outlet; wherein the second drive outlet is associated with the first central drive shaft by way of a first reduction gear arrangement, said arrangement comprising a first gear train that meshes with a sun gear sleeved on the first central drive shaft; a second central drive shaft comprising a worm gear that is driven by the worm of the motor output shaft, wherein the second central drive shaft is associated with the third drive outlet; wherein the third drive outlet is associated with the second central drive shaft by way of a second gear reduction arrangement.

The drive mechanism of the present invention provides three distinct drive outlets, each of which can, by virtue of gearing, be driven at different speeds by a common motor to operate different food processing components on a multi-function food processor with different speed requirements. For example, a blending component can be operated at high speed, whereas a mixing component can be operated at a lower speed.

Preferably the motor output shaft comprises a proximal end portion, a middle portion and a distal end portion, wherein the worm is provided on the middle portion of the motor output shaft and the first cone gear is provided on either the proximal or the distal end portion of the motor output shaft.

Preferably the first gear train comprises: at least one first planet gear mounted on a first planet carrier such that it meshes with the sun gear; a first ring gear that meshes with the at least one first planet gear; and an upper gear box cover and a lower gear box cover configured to locate the at least one first planet gear and the first ring gear in fixed connection with the second drive outlet.

Further preferably the first gear train comprises three first planet gears.

Preferably the second cone gear, the sun gear, the first central drive shaft, the first drive outlet and the second drive outlet are coaxially arranged.

Preferably the worm gear is disk shaped.

Preferably the second gear reduction arrangement is provided by a second gear train that comprises: at least one second planet gear mounted on a second planet carrier, wherein the third drive outlet is fixedly connected to at least one of the second planet gears; a second ring gear that meshes with said at least one second planet gear.

Further preferably the second gear train comprises three second planet gears.

Preferably, the worm gear is stepped and comprises a first step part, a second step part, and a third step part; and wherein the first step part meshes with the motor output shaft and the third step part drives the second gear train to rotate.

Further preferably the third step part of the worm gear comprises a first cone sun gear that meshes with the at least one second planet gear.

Preferably the first drive outlet, the second drive outlet and, optionally, the third drive outlet are arranged perpendicular to the motor output shaft.

Also described herein is a multi-functional food processor that comprises the drive mechanism as described above. Preferably the first drive outlet, the second drive outlet and/or the third drive outlet is coupled to a food processing component.

By adopting the described arrangement of the motor output shaft, the cone gear set and the worm gear, the overall structure of the drive mechanism is made more compact. In addition, the mechanical transmission from the motor to the connected food processing component is more stable and accurate.

The drive mechanism of the present invention not only improves the working efficiency of the multi-function food processor but also delivers a plurality of rotating output speeds. This enables different foods to be processed by the same machine simply by changing the food processing component being used.

The drive mechanism of the present invention has the advantages of small volume, convenient collection, short transmission distance, stable transmission and easy control of output speed.

These and other embodiments of the present invention are further made apparent, in the remainder of the present document, to those of ordinary skill in the art.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

The present invention will now be described with reference to the preferred embodiments shown in the drawings, wherein.

DETAILED DESCRIPTION OF SPECIFIC EMBODIMENTS

Figure 1:
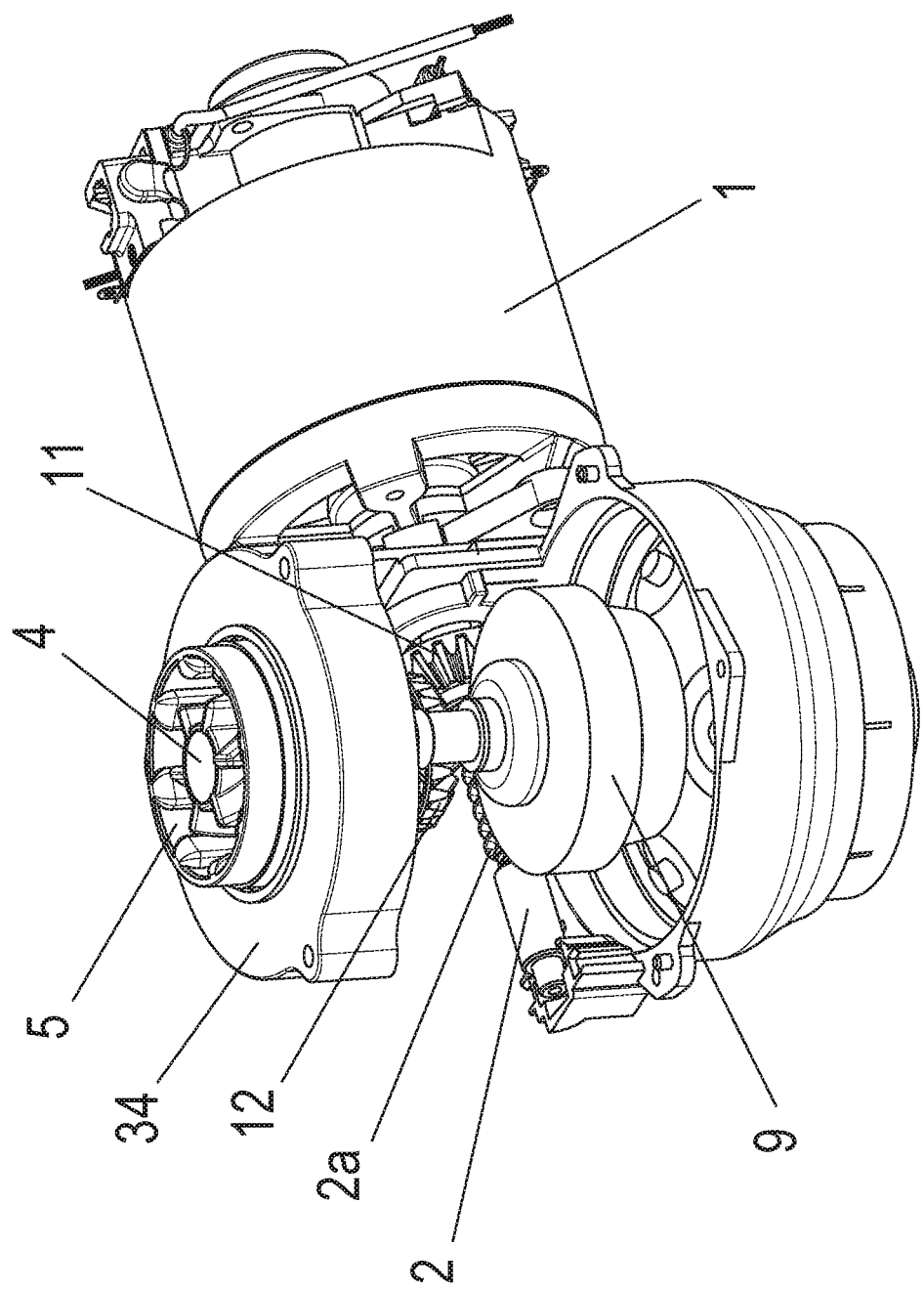
FIG. 1 is a schematic diagram of the overall structure of the drive mechanism for a multi-function food processor of the present invention.

Reference will now be made in detail to the preferred embodiments of the present invention, which are illustrated in the accompanying drawings. The invention may, however, be embodied in many different forms and should not be construed as being limited to the embodiments set forth herein but rather by the claims.

The preferred embodiments are provided so that this disclosure will be thorough and complete, and will fully convey the concept of the invention to those skilled in the art. In the drawings, the thicknesses of layers and regions may be exaggerated for clarity.

Figure 2:
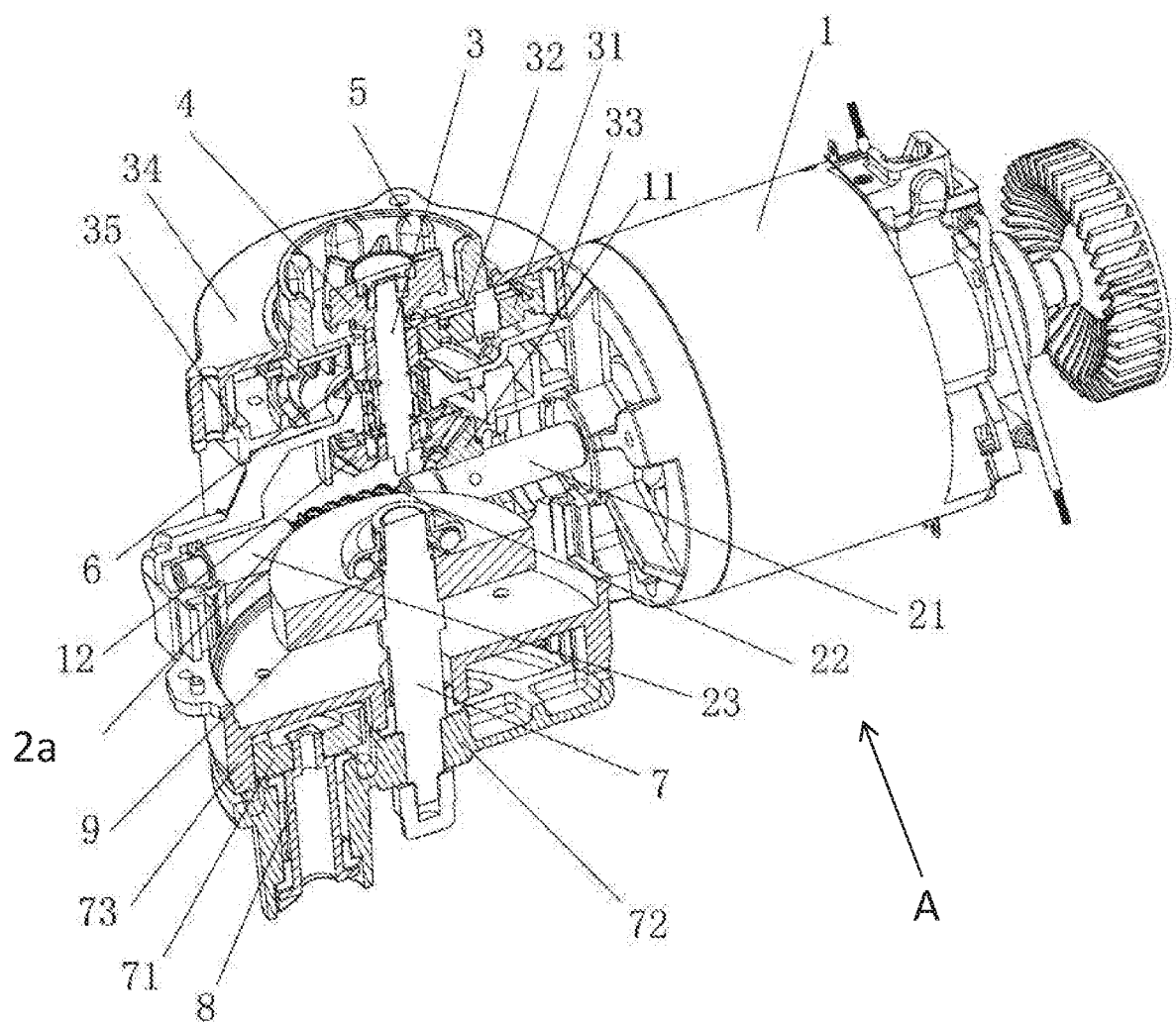
FIG. 2 is a section view of the overall structure of the drive mechanism for a multi-function food processor according to a first embodiment of the present invention.
Figure 3:
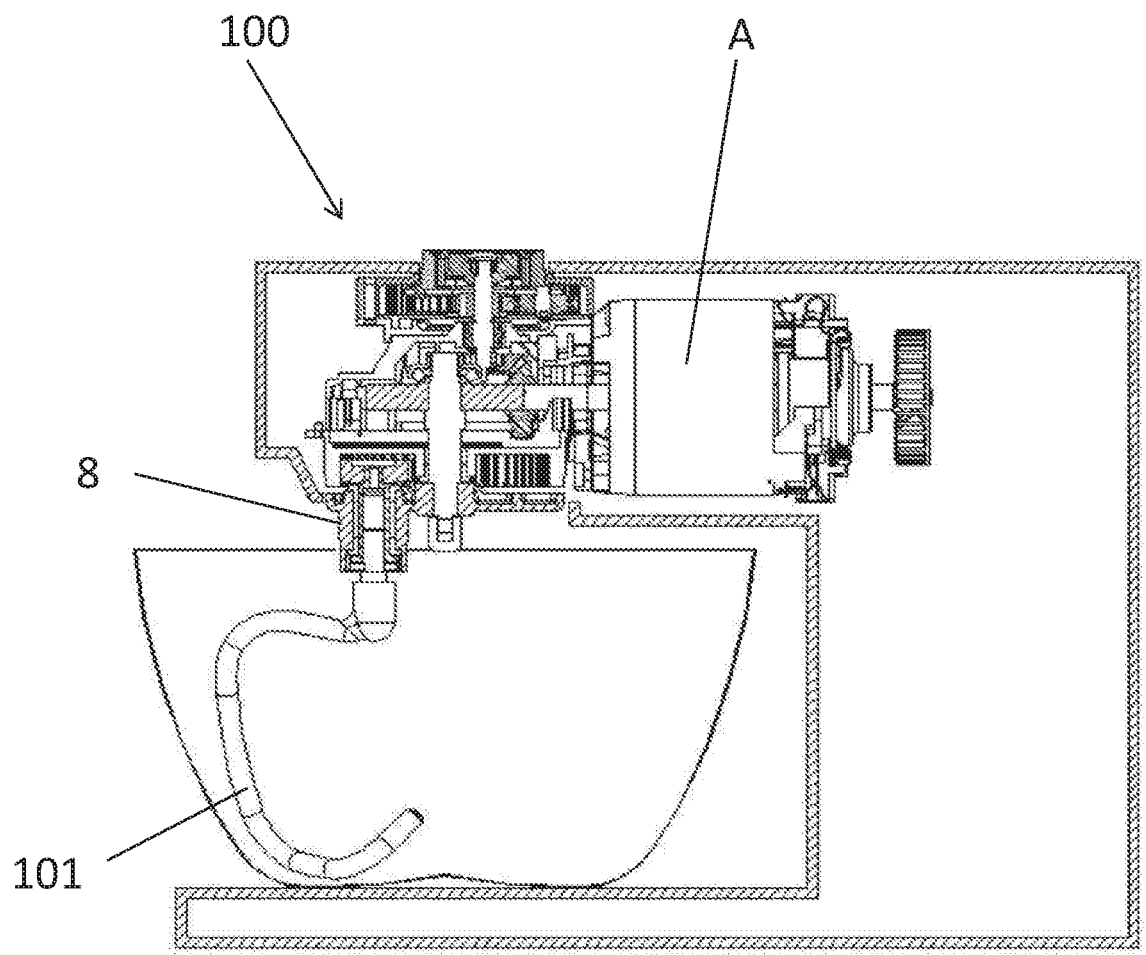
FIG. 3 is a schematic cross-sectional view showing a multi-function food processor with the first embodiment of the drive mechanism connected to a first type of food processing component.
Figure 4:
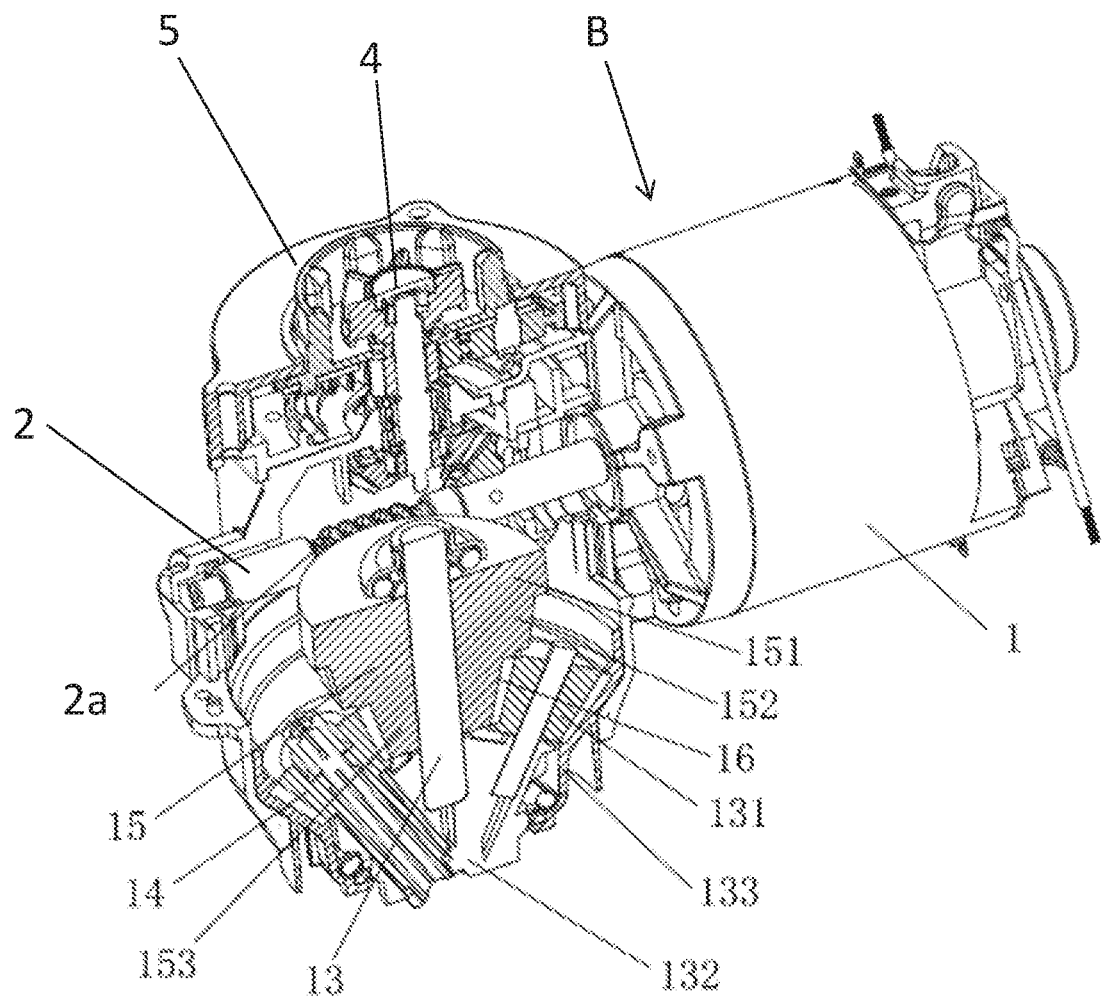
FIG. 4 is a section view of the overall structure of the drive mechanism for a multi-function food processor according to a second embodiment of the present invention.

In a first embodiment of the present invention, as shown in FIGS. 1-3, a driving mechanism A for multi-function food processor is provided. The drive mechanism A comprises a motor 1 and a motor output shaft 2. The motor output shaft 2 is disposed at one end of the motor 1.

The motor output shaft 2 is provided as a worm shaft, which comprises a proximal end portion 21, a middle portion 22 with a helical gear 2a (i.e. a worm), and a distal end portion 23. A cone gear set and a worm gear 9 are associated with the motor output shaft 2.

The cone gear set includes a first cone gear 11 and a second cone gear 12 that mesh with each other. The first cone gear of the first cone gear set is shown in FIG. 2 as being disposed on the proximal end portion 21. However, it is appreciated that the first cone gear 11 could additionally or alternatively be disposed on the distal end portion 23 of the motor output shaft 2.

The second cone gear 12 is provided on the first central drive shaft 3. The first drive outlet 4 and the second drive outlet 5 are respectively arranged on the first central drive shaft.

A sun gear 6 and a first reduction gear train are disposed between the first central drive shaft and the second drive outlet 5. Specifically, the sun gear is sleeved on the first central drive shaft and the first reduction gear train meshes with the sun gear.

A second central drive shaft 7 and a third drive outlet 8 are associated with a worm gear 9 which is driven by the worm 2a.

A second gear train is disposed between the second central drive shaft 7 and the third drive outlet 8. The second cone gear, the sun gear, the first central drive shaft, the first drive-outlet and the second drive-outlet are coaxially arranged.

The first drive outlet 4, the second drive outlet 5 and preferably also the third drive outlet 8 are arranged perpendicular to the motor output shaft. In use, the first drive outlet 4, the second drive outlet 5 and/or the third drive outlet 8 couples to a food processing component (i.e. a mixer, blender, liquidizer, etc. . . . ) so that food may be processed by the machine.

The first gear train comprises a first planet gear 31 that is mounted on a first planet carrier 32 such that it meshes with and is driven by a sun gear 6. The first gear train also comprises a first ring gear 33 that meshes with the first planet gear.

An upper gear box cover 34 and a lower gear box cover 35 are configured to locate the first planet gear 31 and the first ring gear 32 in fixed connection with the second drive outlet 5. The sun gear 6 drives the first gear train. From the perspective of balance and stability, preferably three first planet gears can be provided. The number of first planet gears in the shown embodiment is three.

The sun gear 6 drives the first planet gears 31 of the first gear train. The first planet gears 31 mesh with the associated first ring gear 33. Preferably the first ring gear 33 has a stepped tubular shape.

The second drive outlet 5 is an output end of the first gear train. The second drive outlet can be either ring-shaped or can have the shape of a short tube. Preferably a key or a groove (not shown) is disposed outside the wall of the second drive outlet to engage with a complementary food processing component.

The first planet carrier 32 is integrated with the second drive outlet 5. The first planet gear drives the second drive outlet 5 to revolve around the sun gear 6. By virtue of the first gear train, the rotation speed of the second drive outlet is lower that the rotation speed of the first drive outlet under the action of the common first central drive shaft 3.

In the embodiment of the drive mechanism shown in FIGS. 1-3 the worm gear 9 is in the shape of a disk.

The second central drive shaft 7 passes through the center of the worm gear 9. The second gear train comprises a second planet gear 71 mounted on a second planet carrier 72. The second gear train also comprises a second ring gear 73 that meshes with the second planet gear.

The third drive outlet 8 is fixedly connected to one of the second planet gears 71. The second planet carrier 72 is fixed on the second central drive shaft 7, and the second planet gear 71 meshes with the second planet carrier 72.

It is envisioned that the number of the second planet gears can be between one and four according to requirements; although the most preferable is three. In this embodiment, three second planet gears are used.

The third drive outlet 8 is fixed on at least one of the second planet gears 71. The second ring gear 73 of the second planet gear, and the second planet carrier 72 revolve around the center of the worm gear 9, and in so doing drives the third drive outlet 8 and the second planet gear 71 to rotate twice. This rotation is also carried out by the food processing component 21 connected to the third drive outlet 8. By virtue of the second gear train the rotational speed of the third drive outlet 8 is at a low (i.e. reduced) speed.

FIG. 3 shows that drive mechanism of the first embodiment A provided in a multi-function food processor 100 with a food processing component 101 (i.e. food mixer) engaged by the third drive outlet 8.

The second embodiment of the drive mechanism of the present invention is shown in FIGS. 4-7. The drive mechanism of the second embodiment has many similarities to that of the first embodiment. However, the drive mechanism B differs in the specific implementation in the worm gear and the second gear train. The rest of the structure of the drive mechanism of this embodiment is similar to that of the first embodiment.

In the second embodiment the worm gear 15 is stepped. The worm gear 15, including a first step part 151, a second step part 152, and a third step part 153. The first step part is arranged to mesh with the worm 2a of the motor output shaft 2. The third step part drives the second gear train to rotate.

A cone sun gear 16 is provided between the third step part of the worm gear 15 and the second gear train. The cone sun gear 16 meshes with and drives the second gear train.

The second gear train comprises at least one planet gear 131 mounted on a planet carrier 132 and a ring gear 133 that meshes with said at least one second planet gear 131. The third drive outlet 14 is fixedly connected to at least one of the planet gears 131.

The helical teeth (i.e. worm 2a) provided on the middle portion of the motor outlet shaft 2 mesh with and drive the worm gear 15. The worm gear drives the second central drive shaft 13, and the second planet gears are driven by the cone sun gear 16 fixed on the second central drive shaft.

The number of second planet gears 131 can be more than or equal to three according to requirements. In this embodiment, three second planet gears are used.

The third drive outlet 14 is fixed to at least one of the second planet gears 131. Alternatively, the third drive outlet 14 is integrated with one or more of the second planet gears 131.

The second planet gears 131 mesh with the associated second ring gear 133 whereby the second planet gears 131 and the third drive outlet 14 rotate at the same time. The third drive outlet 14 is connectable to a food processing component 31. By virtue of the second gear train the rotational speed of the third drive outlet 14 is at a low (i.e. reduced) speed.

Figure 5:
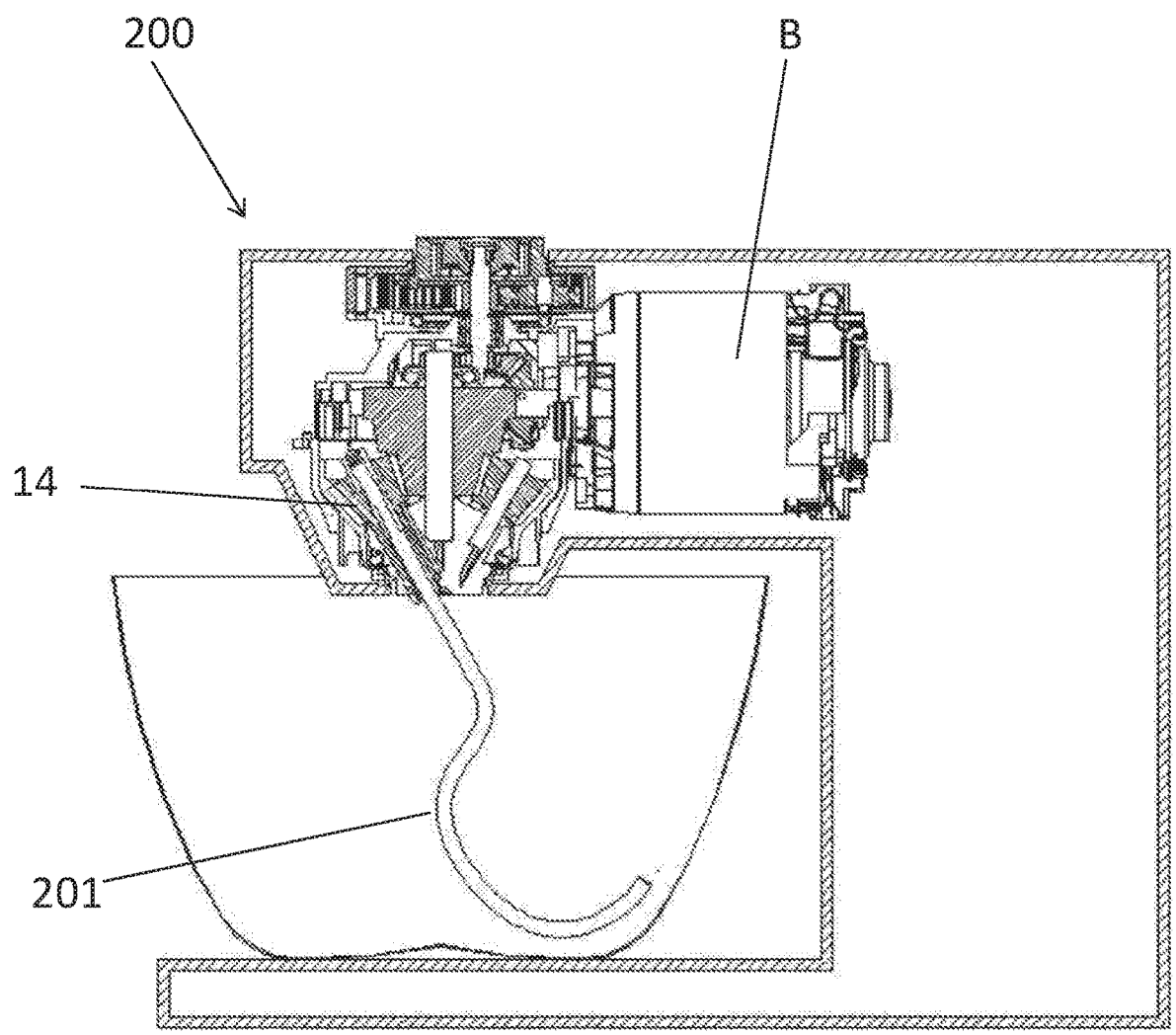
FIG. 5 is a schematic cross-sectional view showing a multi-function food processor with the second embodiment of the drive mechanism connected to a first type of food processing component.
Figure 6:
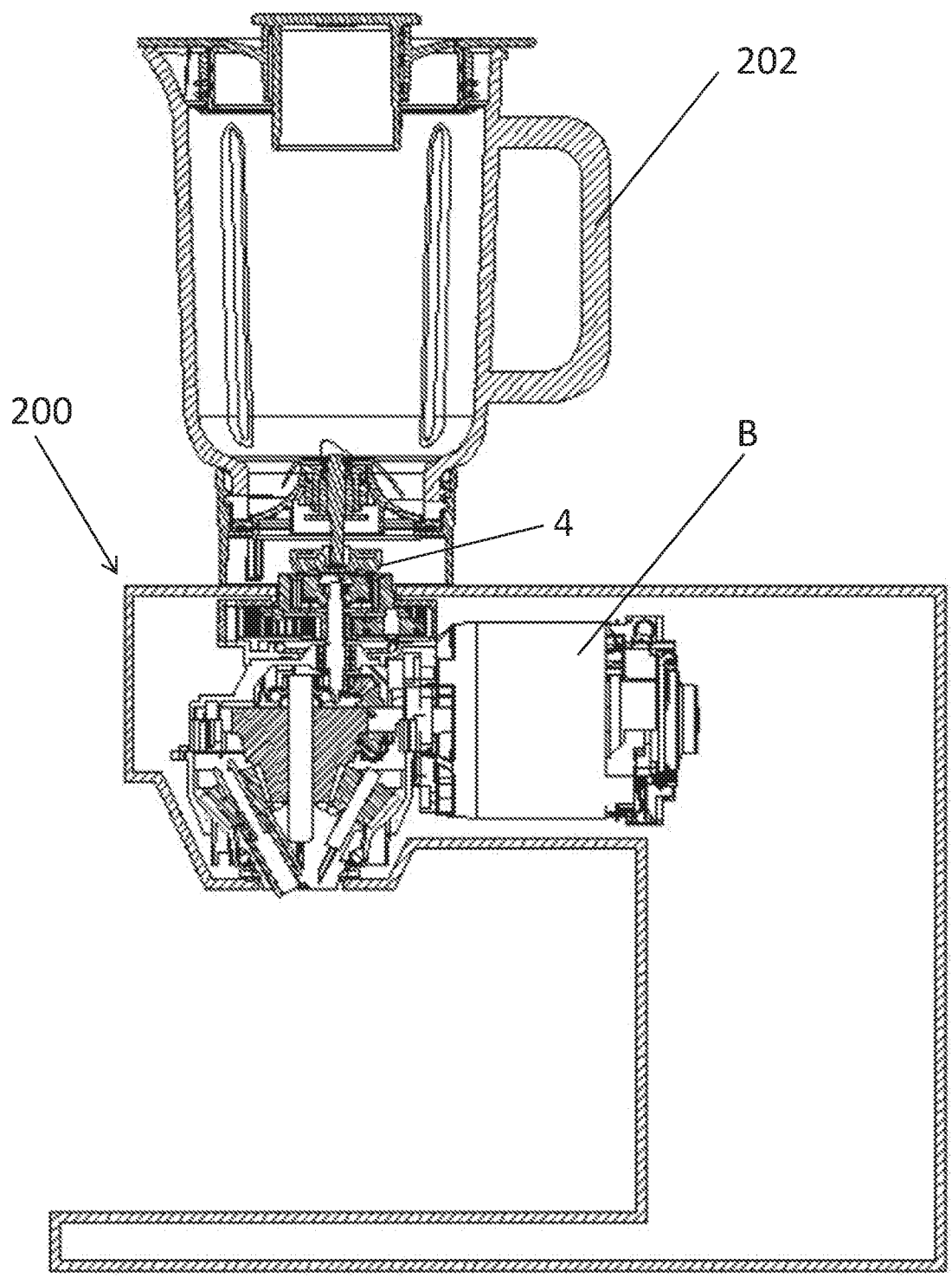
FIG. 6 is a schematic cross-sectional view showing a multi-function food processor with the second embodiment of the drive mechanism connected to a second type of food processing component.
Figure 7:
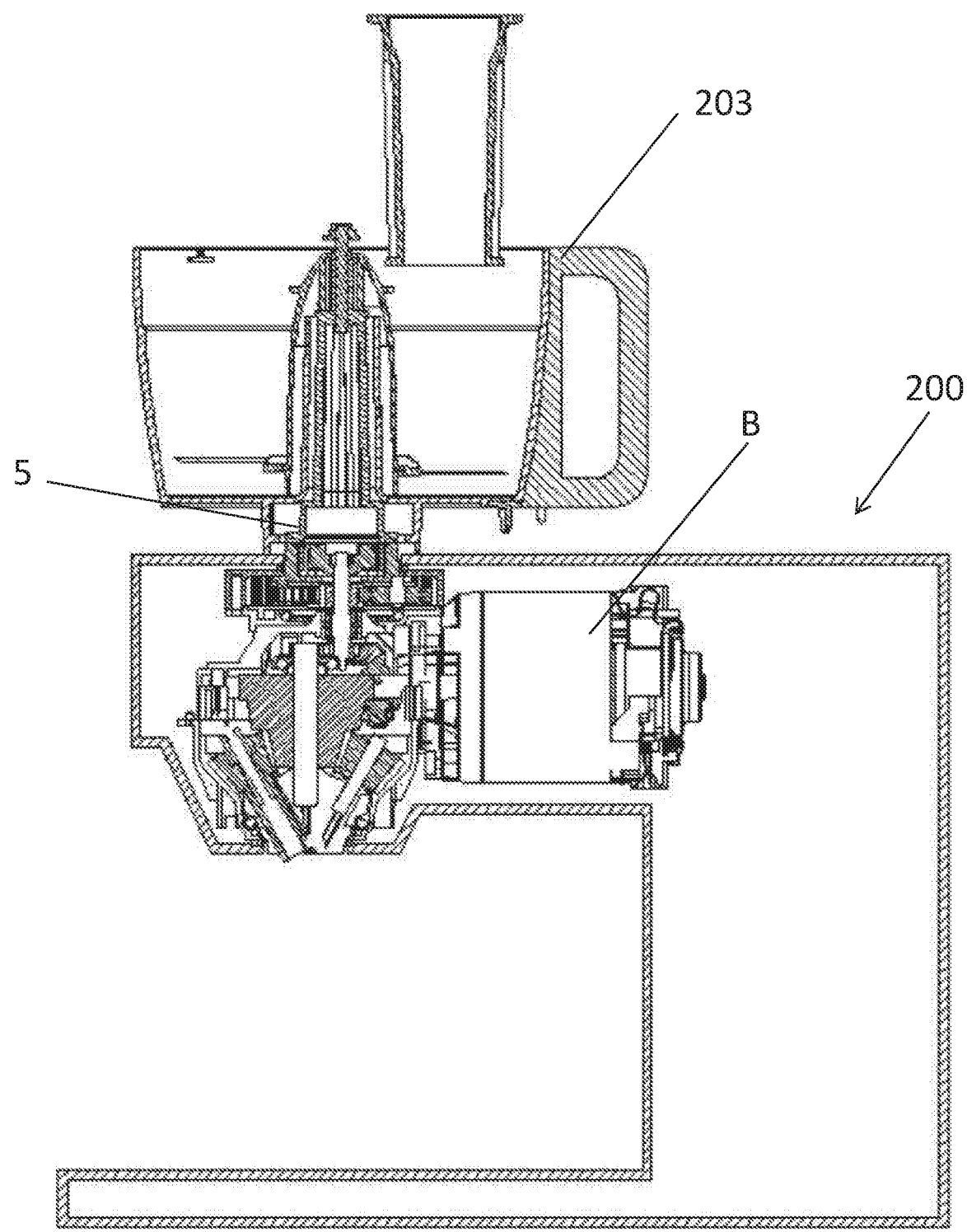
FIG. 7 is a schematic cross-sectional view showing a multi-function food processor with the second embodiment of the drive mechanism connected to a third type of food processing component.

FIGS. 5-7 shows a multi-function food processor 200 comprising the drive mechanism B of the second preferred embodiment. In FIG. 5 the third drive outlet 14 of the multi-function food processor 200 is connected to a first food processing component in the form of a mixer 201.

In FIG. 6 the first drive outlet 4 of the multi-function food processor 200 is connected to a second food processing component in the form of a blender 202.

In FIG. 7 the second drive outlet 5 of the multi-function food processor 200 is connected to a third food processing component 203.

The transmission foundation of the multi-function food processors of the present invention is a motor. The operation of the food processors disclosed herein relies on the output of the motor output shaft 2. The steering is completed by a pair of cone gears and a worm gear. The shifting of rotation speeds is realized under the action of the first gear train and the second gear train. The upper and lower transmission systems of the drive mechanism of the present invention work independently and do not affect each other, enabling connection with a variety of different food processing components to process different foods.

The present disclosure provides a drive mechanism for a multi-function food processor. The disclosure adopts the arrangement of the motor output shaft, the cone gear set and the worm gear, to achieve a more compact overall structure. The disclosed drive mechanism is more stable and accurate. The working efficiency of the whole machine is improved. Further a plurality of rotating speeds can be output, and processing of different foods can be achieved by simply changing the food processing component connected to the machine. This removes the need for multiple devices. The disclosed present invention has the advantages of small volume, short transmission distance, stable transmission and easy control of output speed.

It will be apparent to those skilled in the art that various modifications and variations can be made in the embodiments of the disclosure without departing from the scope of the disclosure, which is defined by the claims.

REFERENCE NUMERALS

A—drive mechanism of the first embodiment
1—motor
2—motor output shaft
   21—proximal end portion
   22—middle portion
   23—distal end portion
   2a—worm
3—first central drive shaft
   31—first planet gear
   32—first planet carrier
   33—first ring gear
   34—upper gear box cover
   35—lower gear box cover
4—first drive outlet
5—second drive outlet
6—sun gear
7—second central drive shaft of first embodiment
   71—second planet gear of first embodiment
   72—second planet carrier of first embodiment
   73—second ring gear of first embodiment
8—third drive outlet of first embodiment
9—worm gear of first embodiment 10—first cone sun gear
11—first cone gear
12—second cone gear
B—drive mechanism of the second embodiment
13—second central drive shaft of second embodiment
   131—second planet gear of second embodiment
   132—second planet carrier of second embodiment
   133—second ring gear of second embodiment
14—third drive outlet of second embodiment
15—worm gear of second embodiment
   151—first step part
   152—second step part
   153—third step part
16—cone sun gear
100—multi-function food processor
101—mixing food processing component
200—multi-function food processor
201—mixer food processing component
202—blender food processing component
203—further food processing component

What is claimed is:

1. A drive mechanism for a multi-function food processor with three drive outlets (4, 5, 8, 14) that can each be coupled separately to a food processing component, said drive mechanism comprising:
a motor (1) with a motor output shaft (2) disposed at one end of the motor, wherein the motor output shaft (2) comprises a first cone gear (11) of a cone gear set and a worm (2a);
a first central drive shaft (3) comprising a second cone gear (12) of the cone gear set that meshes with the first cone gear (11) of the motor output shaft (2), wherein the first central drive shaft (3) is associated with the first drive outlet (4) and the second drive outlet (5);
wherein the second drive outlet is associated with the first central drive shaft (3) by way of a first reduction gear arrangement, said arrangement comprising a first gear train that meshes with a sun gear (6) sleeved on the first central drive shaft (3);
a second central drive shaft (7) comprising a worm gear (9, 15) that is driven by the worm of the motor output shaft (2), wherein the second central drive shaft (7) is associated with the third drive outlet (8, 14);
wherein the third drive outlet (8, 14) is associated with the second central drive shaft (7) by way of a second gear reduction arrangement.

2. The drive mechanism of claim 1, wherein the motor output shaft (2) comprises a proximal end portion (21), a middle portion (22) and a distal end portion (23); and
wherein the worm (2a) is provided on the middle portion (22) of the motor output shaft (2) and the first cone gear (11) is provided on either the proximal or distal end portion (21, 23) of the motor output shaft (2).

3. The drive mechanism of claim 1, wherein the first gear train comprises:
at least one first planet gear (31) mounted on a first planet carrier (32) such that it meshes with the sun gear (6);
a first ring gear (33) that meshes with the at least one first planet gear (31); and
an upper gear box cover (34) and a lower gear box cover (35) configured to locate the first planet gear (31) and the first ring gear (33) in fixed connection with the second drive outlet (5).

4. The drive mechanism of claim 2, wherein the first gear train comprises:
at least one first planet gear (31) mounted on a first planet carrier (32) such that it meshes with the sun gear (6);
a first ring gear (33) that meshes with the at least one first planet gear (31); and
an upper gear box cover (34) and a lower gear box cover (35) configured to locate the first planet gear (31) and the first ring gear (33) in fixed connection with the second drive outlet (5).

5. The drive mechanism of claim 3, wherein the first gear train comprises three first planet gears (31).

6. The drive mechanism of claim 4, wherein the first gear train comprises three first planet gears (31).

7. The drive mechanism of claim 1, wherein the second cone gear (12), the sun gear (6), the first central drive shaft (3), the first drive outlet (4) and the second drive outlet (5) are coaxially arranged.

8. The drive mechanism of claim 2, wherein the second cone gear (12), the sun gear (6), the first central drive shaft (3), the first drive outlet (4) and the second drive outlet (5) are coaxially arranged.

9. The drive mechanism of claim 1, wherein the second gear reduction arrangement is provided by a second gear train that comprises:
at least one second planet gear (71, 131) mounted on a second planet carrier (72, 132), wherein the third drive outlet (8, 14) is fixedly connected to one of the second planet gears (71, 131); and
a second ring gear (73, 133) that meshes with said at least one second planet gear (71, 131).

10. The drive mechanism of claim 9, wherein the second gear train comprises three second planet gears (71, 131).

11. The drive mechanism of claim 1, wherein the worm gear (9) is disk shaped.

12. The drive mechanism of claim 1, wherein the worm gear (15) is stepped and comprises a first step part (151), a second step part (152), and a third step part (153); and
wherein the first step part (151) meshes with the worm (2a) of the motor output shaft (2) and the third step part (153) drives the second gear train to rotate.

13. The drive mechanism of claim 12, wherein the third step part (153) of the worm gear (15) comprises a first cone sun gear (10) that meshes with the at least one second planet gear (131).

14. The drive mechanism of claim 1, wherein the first drive outlet (4) and the second drive outlet (5), are arranged perpendicular to the motor output shaft (2).

15. The drive mechanism of claim 12, wherein the first drive outlet (4) and the second drive outlet (5), are arranged perpendicular to the motor output shaft (2).

16. The drive mechanism of claim 14, wherein the third drive outlet (8, 14) is arranged perpendicular to the motor output shaft (2).

17. A multi-function food processor (100, 200) comprising a drive mechanism according to claim 1, wherein the first drive outlet (4), the second drive outlet (5), or the third drive outlet (8, 14) is coupled to a food processing component (101, 201, 202, 203).

18. A multi-function food processor (100, 200) comprising a drive mechanism according to claim 12, wherein the first drive outlet (4), the second drive outlet (5), or the third drive outlet (8, 14) is coupled to a food processing component (101, 201, 202, 203).

\* \* \* \* \*